United States Patent [19]
Kuster et al.

[11] Patent Number: 5,131,937
[45] Date of Patent: Jul. 21, 1992

[54] DEVICE FOR ALIGNING GLAZING PANES DURING TRANSPORT ON A ROLLER CONVEYOR

[75] Inventors: Hans-Werner Kuster, Aachen; Werner Diederen, Herzogenrath; Heinz-Gunter Zilgens, Palenberg, all of Fed. Rep. of Germany

[73] Assignee: Saint-Gobain Vitrage International, Courbevoie, France

[21] Appl. No.: 763,251

[22] Filed: Sep. 20, 1991

[30] Foreign Application Priority Data

Sep. 25, 1990 [DE] Fed. Rep. of Germany ....... 4030222

[51] Int. Cl.$^5$ ............................................. C03B 35/16
[52] U.S. Cl. ....................................... 65/181; 65/273; 65/289; 198/394; 198/411; 198/456; 271/234
[58] Field of Search ................. 65/181, 273, 375, 163, 65/289; 198/411, 415, 785, 394, 456; 271/234, 248

[56] References Cited

U.S. PATENT DOCUMENTS

| | | | |
|---|---|---|---|
| 3,992,182 | 11/1976 | Frank | 65/163 |
| 4,669,602 | 6/1987 | Ouellette | 198/415 |
| 4,802,904 | 2/1989 | Boutier et al. | 65/273 |
| 4,838,920 | 6/1989 | Blasquez-Gonzales et al. | 65/104 |
| 4,895,244 | 1/1990 | Flaugher et al. | 198/394 |
| 4,976,766 | 12/1990 | Kuster et al. | 65/163 |
| 4,979,974 | 12/1990 | Mathirat et al. | 65/163 |
| 4,985,059 | 1/1991 | Letemps et al. | 65/273 |

FOREIGN PATENT DOCUMENTS 2531838 2/1976 Fed. Rep. of Germany .

Primary Examiner—Joye L. Woodard
Attorney, Agent, or Firm—Oblon, Spivak, McClelland, Maier & Neustadt

[57] ABSTRACT

A roller conveyor has an aligning device for glazing panes. The conveyor includes a plurality of aligned rollers forming a roller bed and driven for advancing glass panes in a conveying direction. The aligning device includes a rail disposed above the rollers and mounted such that it extends at a small horizontal angle to the conveying direction. The rail is disposed relative to the rollers such that an edge of a pane being conveyed on the rollers engages the rails so as to align the pane. The aligning device also includes a ring disposed in the roller bed downstream of the rail in the conveying direction. The ring has an external diameter larger than that of the rollers and is positioned relative to the rail such that the ring can engage a lower surface of a pane conveyed on the rollers at a position spaced from the center of gravity of the pane, and so rotate the pane.

7 Claims, 2 Drawing Sheets

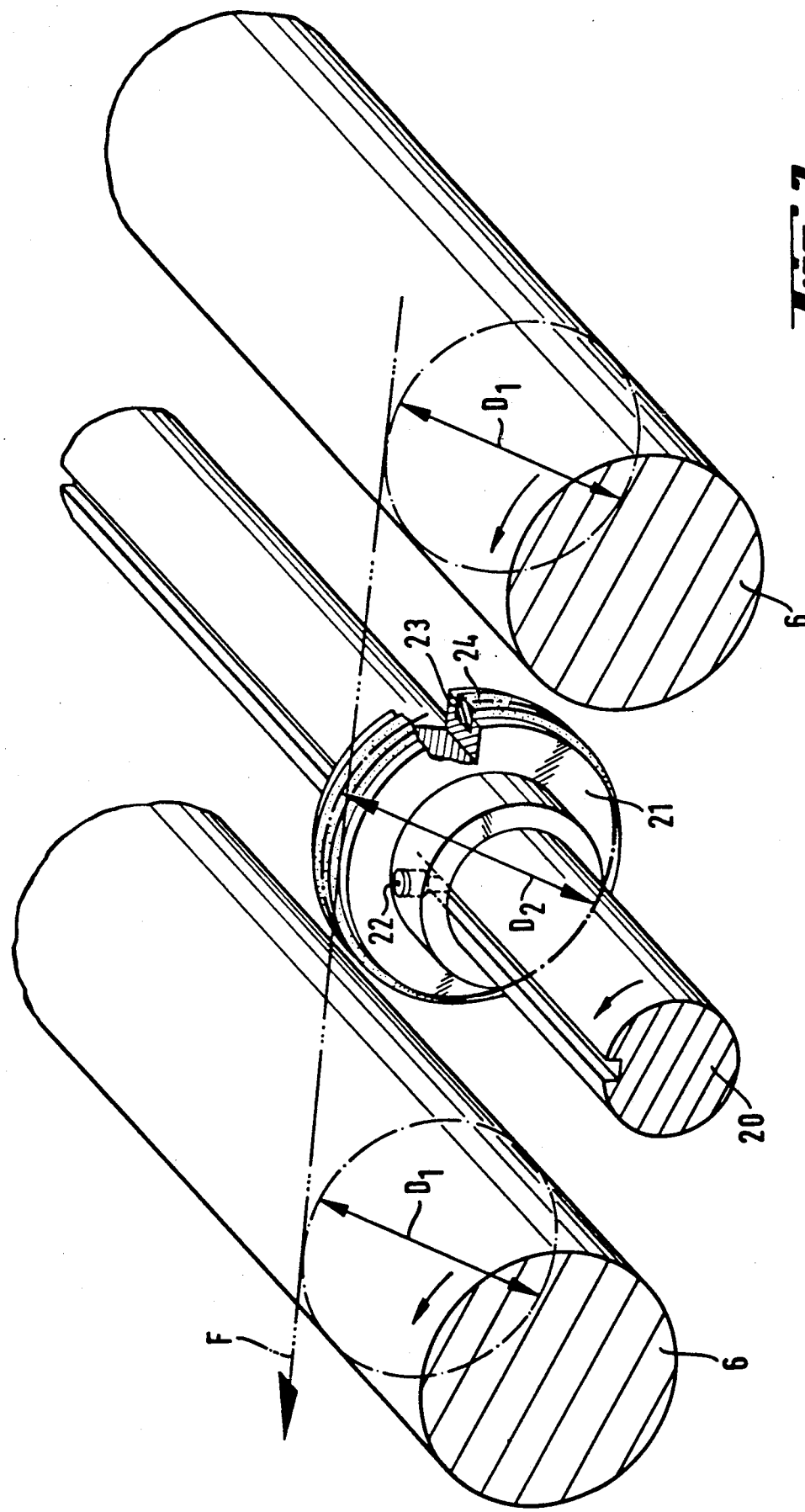

DEVICE FOR ALIGNING GLAZING PANES DURING TRANSPORT ON A ROLLER CONVEYOR

BACKGROUND OF THE INVENTION

1. Field of the Invention

This invention relates to a device for aligning glazing panes during transport on a roller conveyor.

2. Description of the Related Art

Continuously operating bending furnaces for panes of glass or other material, in which the glazing panes pass through a bending chamber where a cylindrical curvature is imparted to them, have a relatively high production capacity. The glazing panes, as they enter the furnace, are laid in closely spaced succession on a roller conveyor, on which they pass at relatively high speed through the bending furnace. In order that the desired cylindrical curvature be given to the glazing panes in the specified direction, these panes must be aligned on the roller conveyor.

In one known aligning device, guide rails are disposed above the conveying rollers on both sides, each at an acute angle to the axis of the roller conveyor, and by sliding contact with the lateral edges of the glazing panes they push them into a central position on the conveying rollers. During the further conveying in the central position, the path of the glazing panes is bounded laterally by two parallel guide rails and, in the conveying direction, by an abutment disposed adjacent to one of these rails. Under the action of this front, lateral abutment and of the drive by the conveying rollers, the glazing pane is rotated into an angular orientation in which one front corner of the glazing pane touches the one lateral guide rail and the opposite, rear corner of the glazing pane touches the other lateral guide rail (U.S. Pat. No. 4,838,920). In this aligning device, the continuous conveying flow of the glazing panes is interrupted by the abutment disposed in the conveying path for the glazing panes.

A device is furthermore known for aligning the glazing panes on a roller conveyor, wherein on each side of the roller conveyor a slider travelling synchronously with the glazing pane is provided, on which plungers movable transversely to the conveying direction are mounted, which are each extended by a predetermined amount during the synchronous movement of the sliders and thus bring the glazing pane into the desired orientation (U.S. Pat. No. 3,992,182). An aligning device of this type is comparatively expensive.

It is furthermore known to arrange, on both sides of a horizontal conveyor, centering rails movable transversely to the conveying direction, which advance one after the other towards the axis of the conveyor and align the glazing pane on the axis of the conveyor (DE-25 31 838 C2).

SUMMARY OF THE INVENTION

An object of the present invention is to create a device for aligning the glazing panes, by means of which the positional alignment of the glazing panes on the roller conveyor can be carried out with simple means even at comparatively high transport speeds of the panes and with a closely spaced succession of the panes on the roller conveyor, without the continuous movement flow of the panes being interrupted.

The device according to this invention is characterized by a rail disposed above the conveying rollers at a small horizontal angle to the direction of conveying, which rail aligns one lateral edge of the glazing panes during the forward movement of the panes, and by a ring disposed in the conveyor bed downstream of the rail and having an external diameter larger than the diameter of the conveying rollers. The position of the ring on the shaft is so chosen relative to the rail that it accelerates the glazing pane on one side, outside the center-of-gravity of the pane, by frictional contact with the lower face of the glazing panes.

In the device according to this invention, therefore, the alignment operation is subdivided into two movements or displacements of the glazing panes, separated in time, of which each partial movement is carried out with comparatively simple means and even while the glazing panes continue to move. In this way it is possible to carry out a precise alignment of the glazing panes even at very high conveying velocities of these panes.

The alignment of the lateral edge extending basically in the direction of conveying is effected by means of the rail mounted fixed in the conveying plane, which is disposed, for instance, at a horizontal angle of 2° to 5° to the direction of conveying. The glazing panes, which are laid by means of an automatic laying machine on the roller conveyor always at the same position and in approximately the same angular orientation, touch this rail with their corresponding lateral edge as they travel and are displaced on the rollers during the sliding movement along the rail as a result of the arrangement of the rail obliquely to the direction of conveying, in such a manner that the lateral edge sliding along the rail possesses, no later than the end of the rail, the alignment determined by the rail both in respect to the position of this edge transversely to the direction of conveying and also in respect to its angular orientation. This alignment operation takes place completely independently of the conveying speed of the glazing panes and of the relative spacing between successive panes.

The succeeding operation of intentional modification of the angular orientation of the glazing panes on the roller conveyor is carried out in as rapid a sequence as desired by means of an entraining ring, disposed on the revolving shaft and acting outside the center-of-gravity of the glazing panes by frictional contact with the panes. By this entraining ring, the glazing panes are lifted on one side off the conveying rollers and are thus conveyed at a higher velocity corresponding to the diameter of the entraining ring, while the glazing panes rest on the other side on the conveying rollers and are conveyed there with the circumferential speed of the conveying rollers. These different speeds lead to the desired further rotational movement.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 is a detail of FIG. 1, drawn to a larger scale.

DETAILED DESCRIPTION OF THE PREFERRED EMBODIMENT

Figure 1:
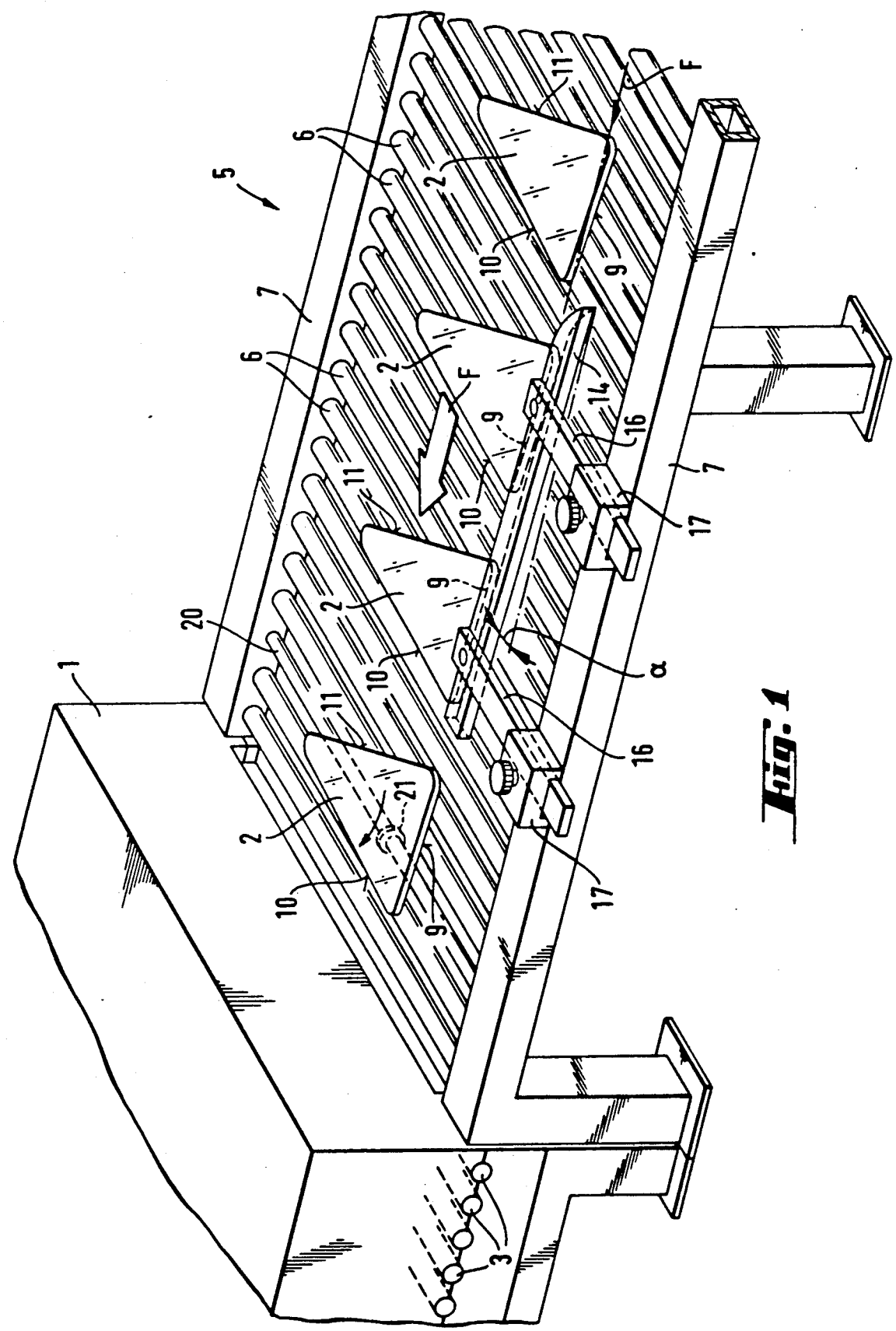
FIG. 1 shows the aligning station according to this invention in perspective overall view.

In the horizontal straight-through furnace 1, the glazing panes 2 are heated to their bending temperature of about 650° Celsius. The conveying of the glazing panes 2 takes place on conveying rollers 3, which are driven in suitable manner at constant speed. The drive of the conveying rollers 2 is not shown here, for clarity.

At the end of the straight-through furnace 1, there is a continuously operating bending station. This bending station is not the subject of the present invention and is also not shown, for the sake of simplicity. A continuously operating bending station can be of various forms. It may comprise a shaping bed which increases in curvature as viewed in the transverse direction, along the conveying path of the panes. Such a shaping bed with increasing transverse curvature can, for example, be made up of curved round bars, on which flexible conveying sleeves revolve, as described for example in DE-PS 26 21 902. Instead of this, the bending station may comprise a shaping bed in which cylindrical conveying rollers are journalled in lateral rails curving upwards or downwards in the direction of conveying so that the glazing panes are bent in the direction of their conveying. A bending station of this type is described, for example, in EP 0 263 030 A1.

Upstream of the straight-through furnace 1 is the laying station 5, which basically comprises a roller conveyor having a bed consisting of the conveying rollers 6. The conveying rollers 6 lie in the same plane as the conveying rollers 3 in the straight-through furnace and are driven at the same circumferential speed as them by non-illustrated driving means. An automatic laying device, not shown, takes the glazing panes 2 individually from stacks of panes and lays them each at the same position on the roller conveyor, where they are conveyed in the direction of arrow F towards the straight-through furnace 1.

In the case illustrated, the glazing panes 2 are triangular panes for the side glazing of automobiles. The triangular panes 2 each have a lateral edge 9, running generally in the conveying direction as they are laid on the roller conveyor, a front edge 10 and a rear edge 11, each of which are at an angle differing from 90° relative to the longitudinal axis of the furnace. Instead of the triangular panes, glazing panes of any other geometry can, of course, be bent.

Just behind the laying position for the glazing panes 2, a straight rail 14 is disposed at the side of the roller conveyor adjacent to the lateral edge 9 of the glazing panes and above the conveying rollers 6. The rail 14 is pivotally mounted on two holding bars 16, which in turn are adjustably mounted transversely to the conveying direction in bearings 17, fixed to the frame 7 of the roller conveyor. In this way, the position of the rail 14 can be set and modified. The rail 14 may be, for example, aligned in such a way that the horizontal angle α, which the rail 14 makes with the conveying direction, is about 3°. The lateral edges 9 of the glazing panes 2, as they touch the rail 14 during their movement, bear against this rail 14 and become so aligned that, immediately after leaving the rail 14, they all adopt the same angular position on the roller conveyor, as determined by the rail 14.

In the region of the roller conveyor, downstream of the rail 14, one of the conveying rollers 6 is replaced by a shaft 20, which is driven at the same angular velocity as the conveying rollers 6. On this shaft 20, which is shown in detail in FIG. 2, a cylindrical wheel or disc 21 is mounted so as to be displaceable in the axial direction of the shaft 20. The cylindrical disc is fixed at the desired position on the shaft 20 by means of a screw 22. On the circumferential surface of the cylindrical disc 21, a rubber ring 24 is disposed in a circumferential groove 23. The outer diameter $D_2$ of the rubber ring 24 is larger than the diameter $D_1$ of the conveying rollers 6. As a consequence, if the rotational speeds of the conveying rollers 6 and shaft 20 are equal, there is a higher circumferential speed of the rubber ring 24 compared with the circumferential speed of the conveying rollers 6. The panes are thus lifted at one end and caused to further rotate, as shown by the arrow in FIG. 1.

As already mentioned, by axial sliding of the cylindrical disc 21 along the shaft 20 and possibly also by using rubber rings 24 of different diameters, the amount of the angular rotation created by this arrangement can be varied to suit the particular requirements.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. Device for aligning glazing panes during transport on a roller conveyor, comprising:
    a rail disposed above the conveying rollers and extending at a small horizontal angle to the direction of conveying, said rail aligning one lateral edge of the glazing panes during travel of the glazing panes on the conveyor; and
    a ring disposed on a driven shaft at a position downstream of the rail in the conveying direction, the ring having an external diameter larger than a diameter of the conveying rollers, the position of which ring on the shaft relative to said rail being so chosen that said ring accelerates the glazing pane at one side thereof, outside a center-of-gravity of the glazing pane by frictional contact with a lower face of the glazing pane.

2. Device according to claim 1, wherein the rail is adjustably mounted displaceable transversely to the direction of conveying of the glazing pane.

3. Device according to claim 1, wherein the angle between the rail and the direction of conveying is 2° to 5°.

4. Device according to claim 1, wherein the shaft carrying the ring moves at the same rotational speed as the conveying rollers.

5. Device according to claim 1 wherein the ring is adjustably mounted on the shaft.

6. Roller conveyor having aligning device for glazing panes, comprising:
    a plurality of aligned rollers forming a roller bed and driven for advancing glass panes thereon in a conveying direction;
    a rail disposed above the conveying rollers and mounted such that the rail extends at a small horizontal angle to the conveying direction, said rail being disposed relative to said rollers such that an edge of a pane being conveyed on the rollers engages the rail so as to align the pane with the rail; and a ring disposed in said roller bed downstream of the rail in the conveying direction, said ring having an external diameter larger than that of said rollers and being positioned relative to said rail such that said ring can engage a lower surface of a pane conveyed on said rollers at a position spaced from the center of gravity of the pane and rotate the pane.

7. The roller conveyor of claim 6 wherein said horizontal angle is 2° to 5°.

* * * * *